(12) United States Patent
Aaltonen et al.

(10) Patent No.: US 7,006,964 B2
(45) Date of Patent: Feb. 28, 2006

(54) COMMUNICATION TERMINALS

(75) Inventors: Janne Aaltonen, Turko (FI); Ari Ikonen, Raisio (FI); Tero Koivunen, San Diego, CA (US)

(73) Assignee: Nokia Corporation, Espoo (FI)

( * ) Notice: Subject to any disclaimer, the term of this patent is extended or adjusted under 35 U.S.C. 154(b) by 578 days.

(21) Appl. No.: 10/023,733

(22) Filed: Dec. 21, 2001

(65) Prior Publication Data

US 2004/0015886 A1 Jan. 22, 2004

Related U.S. Application Data

(60) Provisional application No. 60/267,468, filed on Feb. 9, 2001.

(30) Foreign Application Priority Data

Dec. 21, 2000 (GB) ............................. 0031368

(51) Int. Cl.
*G06F 9/455* (2006.01)

(52) U.S. Cl. ..................... 703/24; 713/201; 705/40; 717/171

(58) Field of Classification Search .............. 703/24; 705/59, 40; 709/203, 219, 249, 229, 217; 713/201; 717/172, 171
See application file for complete search history.

(56) References Cited

U.S. PATENT DOCUMENTS

| | | | |
|---|---|---|---|
| 5,926,631 A | | 7/1999 | McGarvey |
| 5,978,855 A | * | 11/1999 | Metz et al. .................. 709/249 |
| 6,170,060 B1 | * | 1/2001 | Mott et al. ................... 713/201 |
| 6,195,432 B1 | * | 2/2001 | Takahashi et al. .......... 380/277 |
| 6,266,774 B1 | * | 7/2001 | Sampath et al. ............ 713/201 |
| 6,314,565 B1 | * | 11/2001 | Kenner et al. .............. 717/171 |
| 6,529,938 B1 | * | 3/2003 | Cochran et al. ............. 709/203 |
| 6,721,716 B1 | * | 4/2004 | Gross ........................... 705/40 |
| 6,772,192 B1 | * | 8/2004 | Fulton et al. ................ 709/203 |
| 2001/0003828 A1 | * | 6/2001 | Peterson et al. ............. 709/219 |
| 2001/0011253 A1 | * | 8/2001 | Coley et al. .................. 705/59 |
| 2002/0042829 A1 | * | 4/2002 | Mizuhara et al. ........... 709/229 |
| 2002/0066094 A1 | * | 5/2002 | Futakuchi .................... 717/172 |
| 2002/0066109 A1 | * | 5/2002 | Tam et al. .................... 725/106 |
| 2003/0149738 A1 | * | 8/2003 | Jacobs et al. ................ 709/217 |

FOREIGN PATENT DOCUMENTS

GB 2353918 3/2001

OTHER PUBLICATIONS

Custom Device Installation, IBM Technical Disclosure Bulletin, Oct. 1995, No. 10. vol. 38, pp. 569-570.
Autoconf Makes for Portable Software, BYTE, US, MCGraw-Hill, Inc., vol. 22. No. 11, Nov. 1, 1997. pp. 45-46.

* cited by examiner

*Primary Examiner*—Paul L. Rodriguez
*Assistant Examiner*—Kandasamy Thangavelu
(74) *Attorney, Agent, or Firm*—Banner & Witcoff, Ltd.

(57) ABSTRACT

A system, method and apparatus are described for delivering software to a terminal 1. Before software is delivered, an emulator 51 is invoked to validate the operation of the new software in conjunction with the existing terminal configuration.

The invention is particularly suitable to the delivery of so-called thin terminal implementations by manufacturers to which users subsequently add their desired software.

35 Claims, 2 Drawing Sheets

COMMUNICATION TERMINALS

This application claims the benefit of priority of Provisional Application Ser. No. 60/267,468, filed Feb. 9, 2001, the contents of which are incorporated herein by reference.

BACKGROUND OF THE INVENTION

The present invention relates to communication terminals and the provision of software thereto, particularly, although not exclusively, operating system and application software.

Conventionally, communication terminals and in particular mobile terminals such as those telephony devices intended for connection to a Public Land Mobile Network (PLMN) have been delivered to an end user with a fully functioning operating system and applications such as calendar, calculator and the like already installed. The installation of such software on a terminal requires the manufacturer to perform exhaustive, expensive and often time consuming checks into the licensing conditions and copyright and other digital rights applicable to the software. Without such licensing and clearance activity the manufacturer is open to severe liability risks. Such risks will also arise where such activity is not properly or incompletely executed.

SUMMARY OF THE INVENTION

Accordingly, one aspect of the invention provides a software delivery apparatus, comprising a controller connectable to a terminal and responsive to a request therefrom for software, and a terminal emulator operable in accordance with a configuration of said terminal to validate said software prior to delivery to said terminal.

Thus, a terminal may be supplied to a user in a so-called thin implementation, that is with a set of software sufficient to permit the user to connect to the apparatus and carry out basic operations including the ability to request additional software. Advantageously, this permits a terminal manufacturer to restrict the implementation of software on its terminal to that which has been checked and determined to have no potential liability to the manufacturer. It is thus the responsibility of the terminal user to enter into appropriate agreements to obtain any additional software required for the user's terminal. Clearly, the enhancement of a terminal from a thin implementation to a so-called thick implementation by the addition of further elements to that terminal is applicable to many forms of terminal and network topographies. Thus, a mobile communication handset could be enhanced in this manner via a PLMN acting as the access network for an ASP capable of delivering the desired elements. Equally, a Set Top Box (STB) intended for viewing television could be supplied in a thin implementation to a user who could then elect to enhance its capabilities such as to allow interaction with particular content. In this case the access network could be provided by a Public Switched Telephone Network (PSTN) providing the return channel between the STB and the content provider working in tandem with a digital video broadcast (DVB) network over which content is delivered to the STB.

To reduce the possibility of newly acquired software causing operational difficulties to the terminal, the apparatus is capable of emulating a particular software configuration of the terminal. Advantageously, the terminal provides configuration information in tandem with the request for software.

Such information may be utilized by the apparatus to generate an emulation specific to that particular terminal. The network connection to the apparatus also permits the derivation from a manufacturer of information relevant to a particular terminal which information could effect the operation of the terminal. Such information could relate to known problems or upgrades to the terminal not otherwise available from the terminal itself.

According to another aspect of the present invention, there is provided a method of delivering software to a terminal, comprising receiving a request for software from said terminal, sourcing said software, emulating said terminal and validating said software against said emulation prior to delivering said software to said terminal.

The method may be executed by an application service provider (ASP) independent of the terminal manufacturer or indeed the network operator of the terminal making the request. However, where terminal configuration information is available to a network operator, perhaps because the terminal is newly delivered to the user, a default ASP having details of initial terminal configurations may be set by the operator to which all such initial requests for software are directed. This would avoid the need for the terminal or more particularly the presence of software on the terminal necessary to provide configuration information to the ASP.

Subsequently, if permitted by the operator and assuming the relevant software was present on the terminal the user could contact any ASP for further software.It will also be apparent that the method could be employed by the network operator itself.

In addition, the method may include carrying out an initial assessment of the software request to determine whether the software is appropriate for delivery with regard to the present configuration of the terminal making the request.

Depending on the outcome, it may be possible to suggest to the user of the terminal what additional software, if any, should be requested to allow his original request to be met. Such a step would provide a useful initial filter to avoid unnecessary failures during the subsequent terminal emulation step. As such it adds to the confidence of a user of the terminal that the software that is requesting will function correctly and perhaps more importantly not damage or otherwise adversely effect the existing operation of his terminal.

Finally, in respect of a still further aspect of the invention, there is provided a system for delivering software to a terminal comprises a controller having a connection to an access network through which a terminal issues a request for delivery of software, at least one software provider from whom said software is sourced by said controller and terminal emulation means operable in accordance with a configuration of said terminal to validate said software prior to delivery to said terminal.

The software provider may be co-located with the controller in the sense that the software required by the user is sourced locally or from specified providers. This could be the case where the terminal forms part of a network in which its uses will be tightly constrained by the provider. For example, an operator of a Digital Video Broadcast (DVB) network may wish to restrict the delivery of enhanced interactivity components for its STBs to its own products for compatibility and/or commercial reasons.

Alternatively, the user of a mobile terminal may wish to be free to install whatever software that the user chooses in which case the software provider could be selected on the basis of cost, for example, from a database of providers kept updated by the operator of the controller. Thus, the user is provided with a valuable opportunity to personalise his terminal.

BRIEF DESCRIPTION OF THE DRAWINGS

In order to understand the present invention more fully, an embodiment thereof will now be described by way of example and with reference to the accompanying drawings, in which.

DETAILED DESCRIPTION OF THE INVENTION

Figure 1:
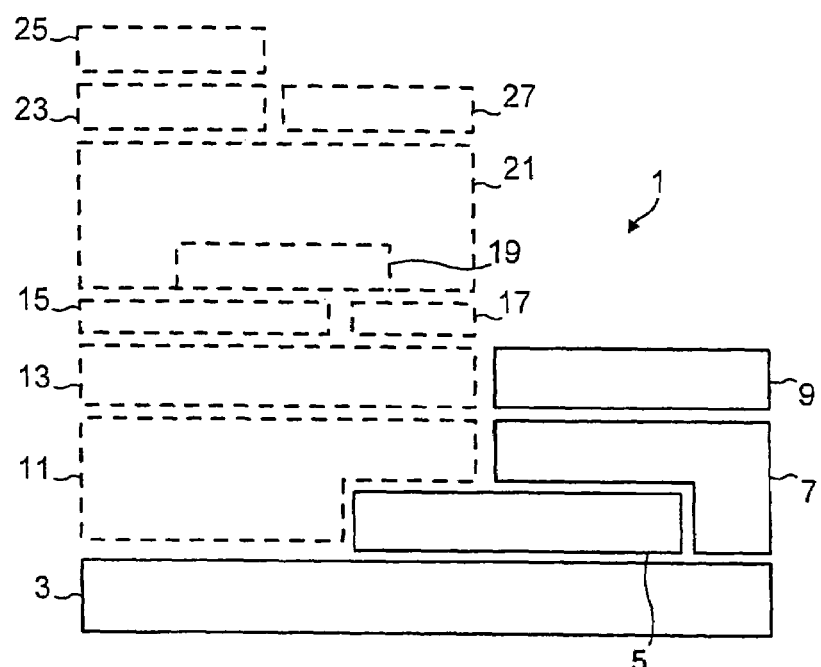
FIG. 1 is a schematic view of a communication terminal architecture for use with the invention.
Figure 3:
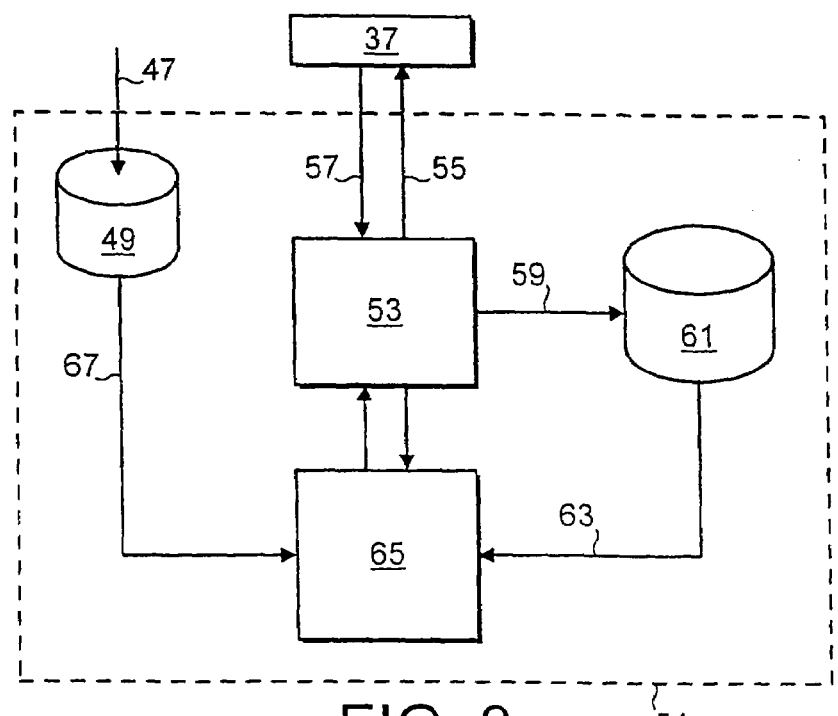
FIG. 3 is detail schematic view of a terminal emulation portion of the system of FIG. 2.
Figure 2:
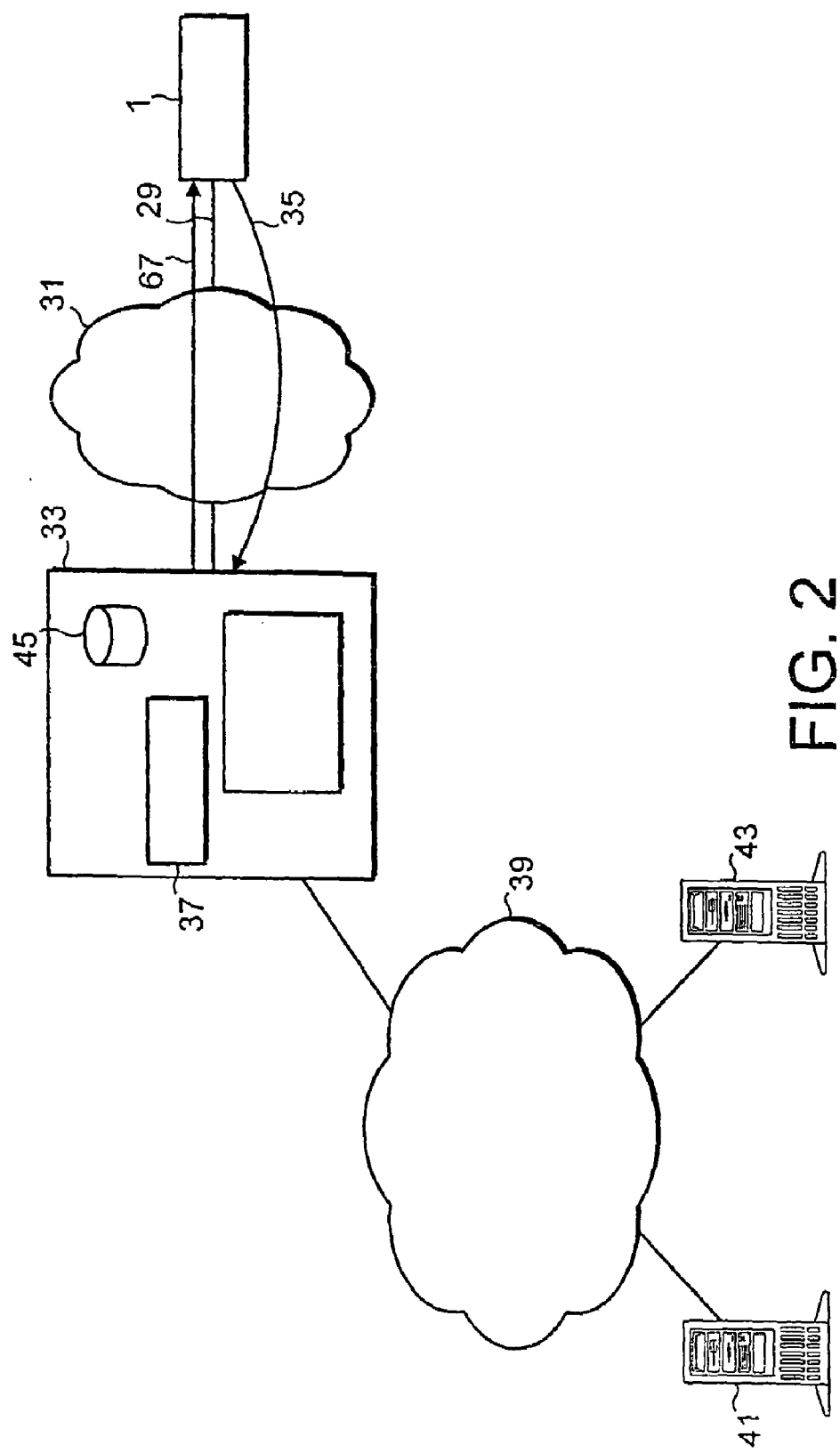
FIG. 2 is a schematic view of software delivery system according to the invention.

Referring to FIG. 1, a communication terminal architecture 1 is shown in which elements of a so-called thin implementation are bounded with a solid line and further optional elements of a so-called thick implementation are bounded with a chain line. A first hardware layer 3, device driver layer 5, basic operating system 7 and native browser 9 form the thin implementation of the terminal. Included within the hardware layer are the entities required for a user to interact with the terminal and for the terminal to establish and maintain a connection with a network. The entities include those appropriate to a mobile and/or fixed terminal. As such entities are well known to those skilled in the art they will not be described further here except to the extent that they assist in understanding the present invention.

In addition to the elements making up the thin implementation of the terminal 1, sufficient additional memory and processing capacity exists to permit further elements to be added to the terminal 1 in a manner which will be described below, thereby enhancing the functionality of the terminal.

Such elements may include an additional operating system 11, middle layer software 13 such as a modem application programming interface (API), Java (trade-mark) native interface 15 and graphics 17, a Java (trade-mark) virtual machine 19 within a Java (trade mark) implementation 21. A further API 23 provides a foundation for further applications 25. A Java (trade-mark) browser 27 may also be included.

A terminal 1 is manufactured and supplied to a user in a thin implementation. Thus, the user is provided with the basic functionality necessary to allow establishment of a connection 29 to a network 31 with which the user has a service agreement. Once connected to the network 31, the native browser 9 permits the user to access an Application Service Provider (ASP) 33 capable of supplying additional elements of the terminal architecture to the connected terminal 1. The terminal manufacturer or network operator may predefine the selection of the ASP. Alternatively or perhaps additionally, the user may be free to select a desired ASP.

Once the terminal 1 has accessed the ASP 33, a request 35 from a user for an element of the terminal architecture is transmitted over the network 31. In addition to identifying the desired element or elements, the request contains information setting out the current configuration of the terminal architecture. The ASP receives the request and either creates or updates a user profile 37 for that terminal 1 which may be supplemented by information provided by a manufacturer and/or network operator of the terminal 1. Such additional information could, in the case of the manufacturer relate to software versions relevant to particular terminals which data may be too lengthy or sensitive to store in the terminal 1 itself. The additional information provided by the operator could identify the services the user subscribes to which might have a bearing on the desirability or otherwise of certain elements of the terminal architecture. Such services might, for example, require the presence of a particular browser or application to access interactive content over a broadband digital broadcast network. In order that the ASP 33 may correctly correlate such additional information with a request 35 from a particular terminal 1 to which it is relevant, some form of identifier common to both the terminal 1 and the additional information would be required. This might take the form of a serial number or IPv6 address range, for example.

The ASP 33 may also analyze the profile 37 and determine from that analysis whether the selected element is appropriate in view of the existing configuration of that terminal. For example, the ASP 33 could recognize that the delivery of a Java (trade-mark) browser 27 is inappropriate where the terminal I is in a thin condition due to the absence of the intermediate software layers. A database 45 holding details of software elements corresponding to the different requirements of various terminals provides the ASP 33 with the ability to identify what elements are required to achieve certain terminal configurations. The database also maintains a list of provider addresses where such elements may be sourced. Such a list will be updated regularly to reflect changes in availability and cost to the ASP 33. A response could then be made by the ASP 33 to the terminal 1 indicating that the request cannot be validated and suggesting the delivery of the appropriate additional elements of the layers necessary to support the desired element.

Once the request has 35 has been received, the user profile 37 determined and the request validated against the profile, the ASP 33 commences sourcing of the desired element or elements subject to any restriction in place from the user profile 37 and in accordance with provider address provided by the database 45.

Thus, the ASP 33 contacts via the Internet 39 one or more software providers 41 and 43. In the event that the desired element is open source or otherwise free of royalty constraints an appropriate provider 41 should deliver the element to the ASP 33. On the other hand, where a payment is required for supply of the desired element, this will be negotiated between the ASP 33 and the provider 43 with the ASP 33 eventually remitting the cost to the terminal user through a suitable mechanism, credit card payment, billing to the user's network operator are some examples.

The new element supplied to the ASP 33 by the provider 41 and 43 is not 20 immediately delivered to the terminal 1 but is placed 47 into a cache 49 forming part of a terminal emulation environment 51. The element is held within the cache 49 whilst an emulation controller 53 requests 55 the user profile 37 appropriate to the terminal 1 for which the element is destined. Details of the profile 37 are returned 57 to the controller 53. Whereupon, the controller 53 generates a request 59 which is received by a store 61 holding a plurality of software blocks at least some of which, in response to the request 59, may be built up into an emulation of the terminal 1 as defined by the profile 37. These blocks are delivered 63 from the store 61 to a emulation space 65 where the emulation is built following which the new element is copied 67 from the cache 49 to the emulation space 65 in a manner analogous to the delivery method by which the element should eventually reach the terminal 1.

The controller 53 is then able to carry out diagnostic checks on the emulation within the space 65 with a view to validating the proposed terminal configuration. Assuming the tests are successful the new element may be delivered via the access network to the terminal where its is installed. Otherwise, the ASP 33 will, in response to a failure during validation, indicate to the terminal that the new element has not been validated with the present terminal configuration together with an indication of the reason for non-validation. Where appropriate, the ASP 33 may suggest possible options which could be carried out in relation to the present terminal configuration to allow validated delivery of the element.

What is claimed is:

1. A software delivery apparatus, comprising a controller connectable to a terminal and responsive to a request therefrom for software, and a terminal emulator operable in accordance with a configuration of said terminal to validate said software prior to delivery to said terminal.

2. An apparatus as claimed in claim 1, including storage for said terminal configuration.

3. An apparatus as claimed in claim 1, wherein said apparatus is connectable to said terminal via a wireless network.

4. An apparatus as claimed in claim 1, wherein the terminal is a set top box.

5. An apparatus as claimed in claims 1, wherein the terminal is mobile communications device.

6. A method of delivering software to a terminal, comprising receiving a request for software from said terminal, sourcing said software, performing an emulation of said terminal and validating said software using said emulation prior to delivering said software to said terminal.

7. A method as claimed in claim 6, wherein said emulation is performed in accordance with a configuration derived from said terminal.

8. A method as claimed in claim 6, wherein said emulation is performed in accordance with a configuration derived from an access network to which said terminal is connected.

9. A method as claimed in claim 8, where said access network is a wireless network.

10. A method as claimed in claim 6, wherein said emulation is performed in accordance with a configuration derived from a manufacturer of said terminal.

11. A method as claimed in claim 6, including selecting a software provider from whom said software is sourced In accordance with a database holding details of software sources.

12. A system for delivering software to a terminal comprising:
a controller having a connection to an access network through which a terminal issues a request for delivery of software;
at least one software provider from whom said software is sourced by said controller; and
terminal emulation means operable in accordance with a configuration of said terminal to validate said software prior to delivery to said terminal.

13. A system as claimed in claim 12, including a software provider database wherein said controller is operable to select from said database a suitable provider as a source to meet said request.

14. A system as claimed in claim 12, wherein said access network is a wireless network.

15. A computer program comprising executable code for execution when loaded on a computer wherein the computer is operable in accordance with said code to carry out the method according to claim 6.

16. A program as claimed in claim 15, stored in a computer readable medium.

17. An application service provider comprising a controller operable to receive a request originating from a terminal, said request identifying a software element for delivery to said terminal, said controller being further operable to determine a configuration of said terminal, in response to said determination to source an appropriate software element to said terminal for delivery to said terminal and to emulate the terminal and validate the software prior to delivery to the terminal.

18. A provider as claimed in claim 17, wherein the controller is operable to generate a user a-profile in response to a determination of a configuration of said terminal.

19. A provider as claimed in claim 18, wherein the controller is operable to supplement said profile using information provided by a manufacturer of said terminal.

20. A provider as claimed in claim 18, wherein the controller is operable to supplement said profile using information provided by an operator of network of which said terminal is a member.

21. A provider as claimed in claims 18, wherein the controller is operable to source said software element only where said request is compatible with said user profile.

22. A provider as claimed in claim 17. wherein said controller is operable to access a database holding details of software elements corresponding to the different requirements of various terminals whereby the controller is further operable to identify what software elements are required to achieve certain terminal configurations.

23. A provider as claimed in claim 17, wherein the controller is operable to access a database maintaining a list of provider addresses where software elements may be sourced.

24. An apparatus as claimed in claim 2, wherein said apparatus is connectable to said terminal via a wireless network.

25. An apparatus as claimed in claim 2, wherein the terminal is a set top box.

26. An apparatus as claimed in claim 3, wherein the terminal is a set top box.

27. A method as claimed in claim 7, wherein said emulation is performed in accordance with a configuration derived from an access network to which said terminal is connected.

28. A method as claimed in claim 7, wherein said emulation is performed in accordance with a configuration derived from a manufacturer of said terminal.

29. A method as claimed in claim 8, wherein said emulation is performed in accordance with a configuration derived from a manufacturer of said terminal.

30. A method as claimed in claim 9, wherein said emulation is performed in accordance with a configuration derived from a manufacturer of said terminal.

31. A method as claimed in claim 7, including selecting a software provider from whom said software is sourced in accordance with a database holding details of software sources.

32. A method as claimed in claim 8, including selecting a software provider from whom said software is sourced in accordance with a database holding details of software sources.

33. A method as claimed in claim 9, including selecting a software provider from whom said software is sourced in accordance with a database holding details of software sources.

34. A method as claimed in claim 10, including selecting a software provider from whom said software is sourced in accordance with a database holding details of software sources.

35. A system as claimed in claim 13, wherein said access network is a wireless network.

\* \* \* \* \*

UNITED STATES PATENT AND TRADEMARK OFFICE
CERTIFICATE OF CORRECTION

PATENT NO. : 7,006,964 Page 1 of 1
APPLICATION NO. : 10/023733
DATED : June 13, 2006
INVENTOR(S) : Janne Aaltonen et al.

It is certified that error appears in the above-identified patent and that said Letters Patent is hereby corrected as shown below:

In the Claims:
Claim 11, Column 5, line 45:
Please replace "In" with --in--

Claim 18, Column 6, line 13:
Please replace "a-profile" with --profile--

Claim 22, Column 6, line 25:
Please replace "claim 17." with --claim 17,--

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,006,964 B2　　　　　　　　　　　　　　　　　　Page 1 of 1
APPLICATION NO. : 10/023733
DATED : February 28, 2006
INVENTOR(S) : Janne Aaltonen et al.

It is certified that error appears in the above-identified patent and that said Letters Patent is hereby corrected as shown below:

In the Claims:
       Claim 11, Column 5, line 45:
       Please replace "In" with --in--

Claim 18, Column 6, line 13:
       Please replace "a-profile" with --profile--

Claim 22, Column 6, line 25:
       Please replace "claim 17." with --claim 17,--

This certifcate supersedes Certificate of Correction issued August 15, 2006.

Signed and Sealed this

Nineteenth Day of September, 2006

JON W. DUDAS
*Director of the United States Patent and Trademark Office*